(12) United States Patent
Momayez et al.

(10) Patent No.: US 6,993,977 B2
(45) Date of Patent: Feb. 7, 2006

(54) REMOTE STRUCTURAL MATERIAL EVALUATION APPARATUS

(76) Inventors: Moe Momayez, 85 Brittany, Suite 301, Montreal, Q.C. (CA), H3P 1A5; Ferri Hassani, 300 Berkshire Ave., Beaconsfield, Q.C. (CA), H9W 1A5

( * ) Notice: Subject to any disclaimer, the term of this patent is extended or adjusted under 35 U.S.C. 154(b) by 0 days.

(21) Appl. No.: 10/314,127

(22) Filed: Dec. 9, 2002

(65) Prior Publication Data

US 2003/0145659 A1 Aug. 7, 2003

Related U.S. Application Data

(60) Provisional application No. 60/337,147, filed on Dec. 10, 2001.

(51) Int. Cl.
*G01L 1/24* (2006.01)

(52) U.S. Cl. .............................. 73/800; 73/649; 73/655
(58) Field of Classification Search .......... 73/700–756, 73/800, 649, 655
See application file for complete search history.

(56) References Cited

U.S. PATENT DOCUMENTS

| | | | | |
|---|---|---|---|---|
| 3,924,456 A | * | 12/1975 | Vahaviolos | 73/770 |
| 3,979,670 A | * | 9/1976 | Vahaviolos | 324/103 P |
| 4,347,748 A | * | 9/1982 | Pierson | 73/862.324 |
| 4,554,836 A | * | 11/1985 | Rudd | 73/657 |
| 4,633,715 A | * | 1/1987 | Monchalin | 73/657 |
| 5,000,030 A | * | 3/1991 | Umeda et al. | 73/1.39 |
| 5,131,748 A | * | 7/1992 | Monchalin et al. | 356/486 |
| 5,361,638 A | * | 11/1994 | Pettersson et al. | 73/800 |
| 5,983,701 A | | 11/1999 | Hassani et al. | |
| 6,321,601 B1 | * | 11/2001 | Maris | 73/657 |

FOREIGN PATENT DOCUMENTS

CA 1011944 6/1977

* cited by examiner

*Primary Examiner*—Edward Lefkowitz
*Assistant Examiner*—Jermaine Jenkins
(74) *Attorney, Agent, or Firm*—McFadden, Fincham

(57) ABSTRACT

A method of unobtrusive evaluation of structural material integrity without requiring physical contact for referencing integrity values, comprising: directing an impact source at said structural material; obtaining signal information from the structural material by optical reflectometry; and, processing the signal information to determine physical properties of the structural material.

17 Claims, 3 Drawing Sheets

REMOTE STRUCTURAL MATERIAL EVALUATION APPARATUS

CROSS-REFERENCE TO RELATED APPLICATION

This Application claims benefit of 60/337,147 filed on Dec. 10, 2001.

FIELD OF INVENTION

The present invention relates generally to a non-destructive method for evaluating structure integrity. More particularly, the present invention encompasses a method for remote assessment of material integrity for a structure such as a furnace lining, concrete structures, geological material structures, etc., without requiring direct contact with the material being evaluated.

BACKGROUND OF THE INVENTION

The need for evaluating the integrity of structural material has long been a time-consuming process involving individual point sampling or a complicated series of tests resulting in significant down-time of the structure and most likely incurring damage to the structure.

For example, refractories are large brick, ceramic or composite blocks used to line kilns and furnaces of metallurgical plants which eventually wear gradually introducing defects to the structure. These defects are usually found on the interior or opposing side(s) of the structure and must be assessed in order to obviate further structural damage to the furnace which would otherwise require investment of money and time to repair.

Typically, during conventional testing of, for example, a refractory, a bar is lowered into the furnace to measure the exact depth, inferring thickness of the refractory, and core samples or samples of solidified metal are extracted from the base of the furnace to measure thickness, locate delaminations and test strength and elastic properties. This method is both time consuming and contributes to further damage of the structure. Similar problems exist for several applications, such as road and pavement material, tunnel linings and concrete shafts, etc.

Moreover, conventional testing of structural material integrity involves human intervention to ensure proper contact between the evaluation device and the substrate of the structure material. This is specifically undesirable when testing must occur in hazardous conditions such as in nuclear power plants, or the like.

Other methods of non-destructive analysis of the material of a structure have been contemplated as, for example, in U.S. Pat. No. 4,782,701, Procter. This patent teaches an acoustic emission transducer directly relating a specific physical quantity, such as tangential displacement, to dynamic displacement inferred from the voltage output of the system disclosed. Briefly, tangential motion of the sensing transducer for this system produces a voltage-time output that closely matches calculated time function for the tangential component of the surface displacement. However, this method requires physical contact of both the surface to be analyzed and the measuring device. Further inherent difficulties with this methodology include interfering acoustic signals which involves time-consuming calibration of the transducer and polarization of the electrode system.

Another method of non-destructive analysis considered is based on U.S. Pat. No. 5,983,701 Hassani et al. This method involves the use of a portable miniature seismic reflection system (referred to as an MSR) which analyzes geometrical material structures. The basic principle of acoustic measurement is carried out using an impact source striking the surface of the material to be analyzed and transducers as sensors detecting reflected signals from an interface of the structure. Once again, direct physical contact between the analyzing apparatus and the surface of the structure material must be established in order to achieve the desired results.

The methods noted above are particularly suitable for structures which are readily accessible. It should be noted that these methods do not contemplate the need for analyzing structures which are not readily accessible, such as refractory linings of furnaces. Moreover such methods are not readily adaptable for dangerous and uninhabitable areas, such as nuclear power plants.

Thus, the present invention provides for a method of assessing the integrity of the material of a structure without requiring direct contact with the structure making it possible to assess material or locations which are generally difficult or dangerous to access. Environment conditions, such as heat, are no longer a factor as opposed to conventional methods. It is also possible with the present invention to significantly reduce, if not eliminate, damage incurred during conventional testing.

SUMMARY OF THE INVENTION

In one embodiment of the present invention, there is provided a method of unobtrusive evaluation of solid non-flexible structural material integrity without requiring physical contact for referencing integrity values, comprising:

directing an impact source at the structural material to generate stress waves derived from the structural material;

obtaining signal information from stress waves emanating from the structural material by optical reflectometry;

increasing frequency bandwidth of the obtained signal by waveguides; and, processing the signal information to determine physical properties of the structural material.

Preferably, the optical reflectometly comprises a laser, the impact source is a mechanical impact source, the signal information includes measuring reflected stress wavefronts, the processing includes processing the stress wavefronts which comprise S- and P-wavefronts, the processing determines physical properties of the structural material which establish integrity characteristics, the integrity characteristics can be stored and viewed on a monitor device, and the processing means includes a laser beam.

It is also preferable the waveguides comprise plates in a cylindrical or pyramid form.

In another embodiment of the present invention, there is provided, a method of unobtrusive analysis of a refractory component in a kiln or furnace structure without physical contact for referencing integrity values comprising:

directing an impact source to impact the substrate of a structural material to cause a stress signal in the form of a wavefront;

transmitting the wavefront to the refractory laser;

detecting an impact signal from the structural material with an optical reflectometry laser; and, converting said impact signal to physical property elements of the structural material with programming means.

It is desirable in the above embodiment the impact source is a laser beam, the laser beam light strikes the structural material causing a stress signal in the form of wavefronts, the wavefronts comprise S- and P-wavefronts, and the laser directs a signal to the computer program for converting the signal into appropriate forms of the physical properties of the structural material.

In another embodiment of the present invention, there is provided an apparatus for unobtrusive evaluation of solid non-flexible structural material integrity without requiring physical contact for referencing integrity values comprising:

an impact source;

an optical reflectometry laser for generating stress signals derived from the structural material and for receiving stress signals from the structural material, the laser generating an output data signal adapted to be received by a computer;

increasing frequency bandwidth of the stress signals by waveguides; and, a computer program for determining structural integrity values from stress signals.

Desirably, the optical reflectometry comprises a laser, the impact source is a mechanical impact source, and the waveguides comprise plates in a cylindrical or pyramid form.

Having thus generally described the present invention reference will now be made to the accompanying drawings described hereinbelow.

DETAILED DESCRIPTION OF THE INVENTION

Figure 1:
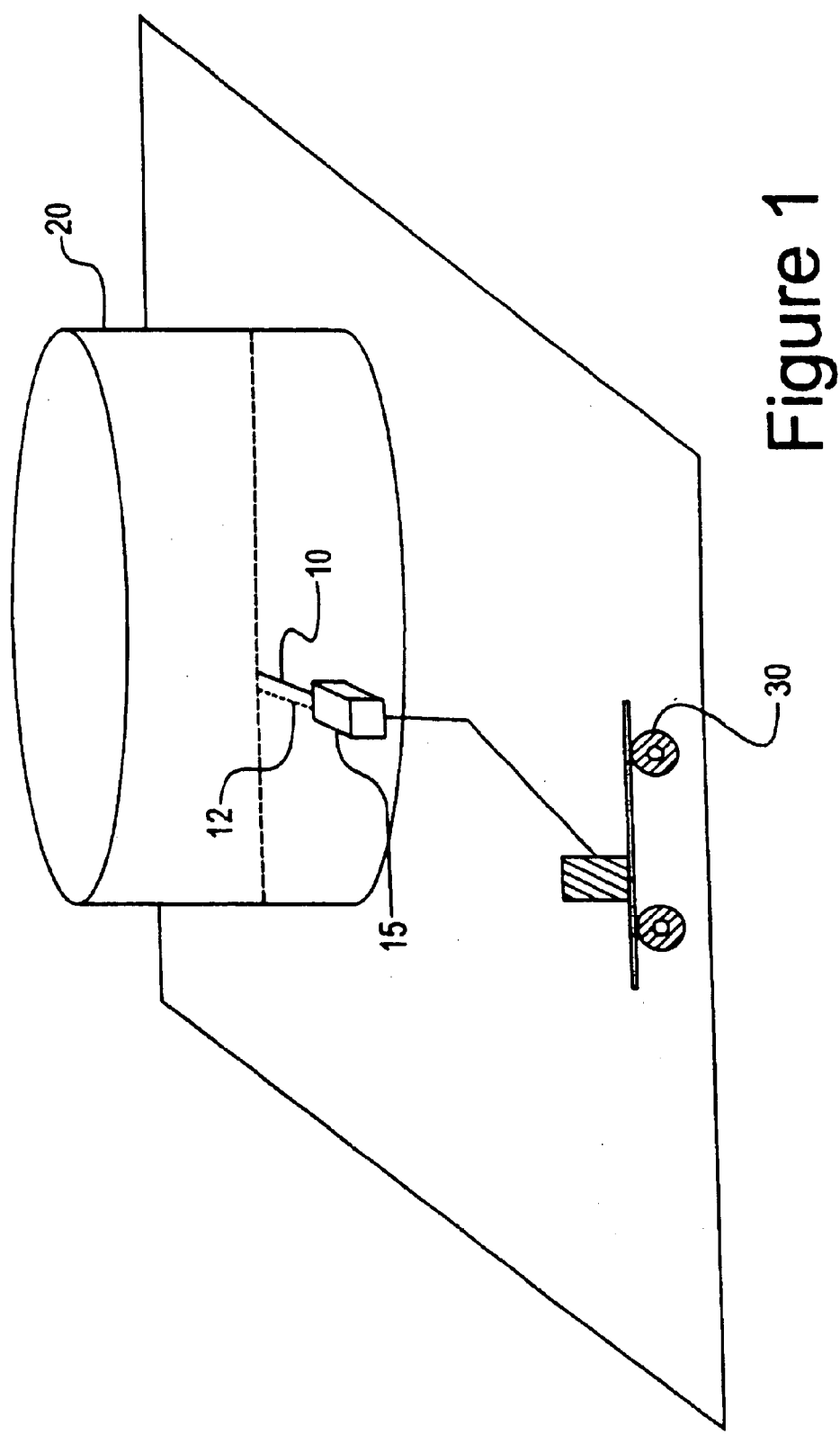
FIG. 1 is a schematic representation of the apparatus in use.

FIG. 1 illustrates a miniature seismic reflection (MSR) system in use for evaluating structural material integrity. It is to be understood that a refractory component of a furnace is used by way of example and that similar applications will be known to persons skilled in the art.

Figure 2:
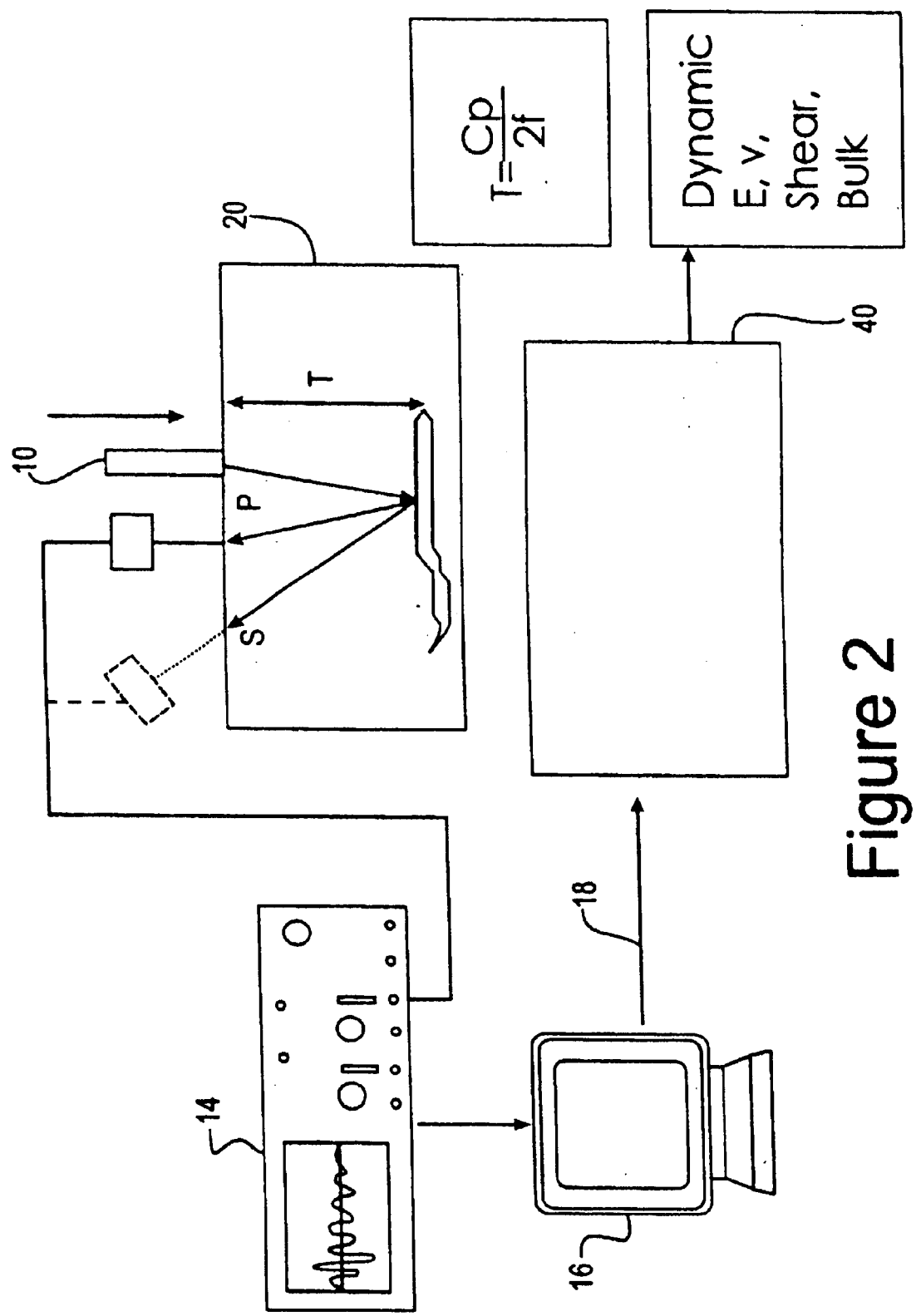
FIG. 2 is a schematic representation of the apparatus.

The system generally comprises an impact source 10 linked to an optical laser reflectometry 15, an analog to digital (A/D) converter card or a digital oscilloscope 14 and a portable computer 16. A Fast Fourier Transform (FFT) program 18 can form part of the computer programing and converts signals from time domain to frequency domain. The results are output as elastic wave velocities, dynamic elastic constants and waveforms of vibrations caused by S- and P-wavefronts as shown in FIG. 2.

Figure 3:
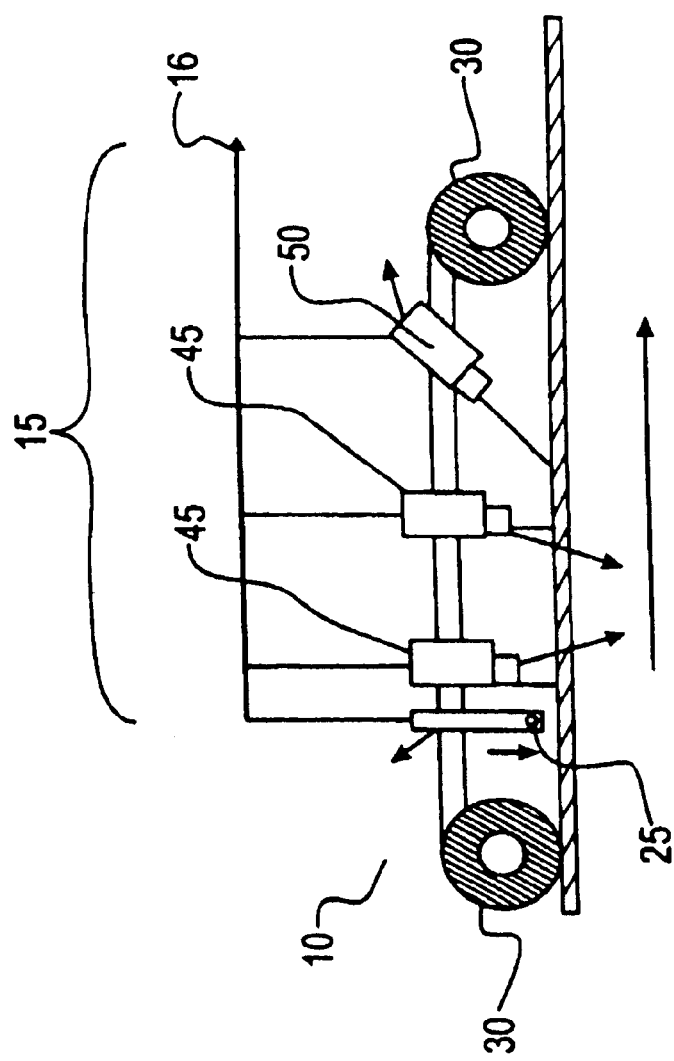
FIG. 3 is a schematic representation of the apparatus in use with conventional mechanical means of movement.

These outputs, derived in part from FFT programming, can be viewed by way of a monitor and also can be recorded and stored using a conventional media recording and storage device. An optional feature would be to include the oscilloscope 14 embodied in the computer system 16 allowing the entire system to be moved by an adjustable mounting means. Such a mounting means may be any movable device including the device as shown in FIGS. 1 and 3 having wheels 30. An optical reflectometry laser beam 15 directs the beam to the device enabling non-contact evaluation of the structure which will be further described herein below.

The stress signal transforms into the body waves and surface waves 20 (See FIG. 2), depending on the material quality of the medium. The body waves travel into the test object and any change in the acoustic properties of the medium results in their reflection toward the source direction. The change of acoustic properties could be as a result of any internal cracks or flaws or different material such as rocks. The reflected wavefronts are picked up by the optical reflectometry laser beam 15 which is sensitive to the vibrations caused by the P-wavefronts at a right angle to the surface and to the vibrations caused by the S-wavefronts parallel to the surface. FIG. 3 illustrates one embodiment which includes P-wavefronts detected at the vertical displacement 45 and S-wavefronts detected at the tangential displacement 50. These signals are amplified 40 and transferred to an A/D card. The sampling rate and number of data points were arranged as required, for each test on the A/D card. Although measuring the time between arrivals of the P- and S-waves at the surface is complicated, the measurements can be converted into a frequency domain spectrum. The time domain waveforms are transferred to a portable computer to be converted into frequency domain spectra by the Fast Fourier Transform (FFT) 18 technique. The frequency spectra is generated by a signal processing software and displayed by the portable computer 16 for the required analysis. The frequency associated with the stress wave resonance between the two surfaces (e.g. top surface/flaw or top/bottom surfaces) becomes readily identifiable.

The size of the impact tip 25 will vary in accordance with the impact strain required. Typical tip diameters and mass and energy constants are as follows:

The range of strain properties generated by the impact device 10 is to classify MSR system as an apparatus capable of measuring dynamic elastic properties.

The transient impact of a spherical object on surface of a solid generates P- and S-(body) waves as well as R-(surface) wave. A spherical impact source 10 acts as a point source which is responsible for generating spherical body waves in a solid. The duration of the impact or contact time, $t_c$, is an important parameter in MSR testing. The contact time is mainly controlled by the diameter of the sphere and surface conditions of the testing surface. The smaller the diameter of the sphere and the smoother the surface of the testing area is, the shorter the contact time of impact will become. The contact time controls the frequency content of the waves generated by the impact. The force-time function of the impact can be approximated as a half-cycle sine curve. The width of the curve is the contact time. The time-history of R-wave produces a vertical surface displacement. The time-history of the R-wave has the shape of the force-time function of the impact. Therefore, the force-time function of the R-wave can be used to estimate the contact time of an impact. A spherical impact contains a wide range of frequencies. The spherical impact with short contact times have a broader range of frequencies but low amplitude waves. The impacts with longer contact times have a narrower band of lower frequencies and higher amplitude waves. The low frequencies have longer wavelengths and travel longer and deeper in a medium. Short wavelengths have the advantage of detecting small defects but the disadvantage of having rapid attenuation and thus shallow penetration. The large diameter spheres are used to generate impacts with longer contact times and longer wavelengths, to detect deeper flaws or evaluate thicker structures. In order to evaluate the integrity of a medium, at least one full wavelength should travel the path length, back and forth, three full cycles. Thus, the choice of the impactor and its contact time depends on the thickness of the testing specimen and the size and the depth of the flaw or the reinforcement bars (in the case of concrete). The impact should generate waves having wavelengths smaller or equal to the thickness of the testing specimen. To detect a flaw within a media, the wavelengths should be smaller than its dimensions. Contact time of the impact should always be shorter than PP- or SS-wave arrivals.

An alternative to conventional impact sources 10 would include the use of a laser beam 12. The laser beam 12 can be any conventional laser beam which emits a suitable stress signal into the structure to be analyzed by the optical reflectometry laser beam 15. Thus, analysis of structural integrity can be achieved completely without contact by the impact device.

To use the correct impact source 10 for a specimen, first the required wavelengths should be determined. Later, the wavelengths can be converted to a suitable frequency using the following equation.

$$v\lambda^{-1}$$

and determining the elastic wave velocities in the specimen. In a solid, for a given impact the wavelengths of compressive waves are longer than shear waves. Therefore, the upper limit of wavelengths traveling the path length depends on the P-wave. Thus a contact time that is short enough to generate the required frequencies can be selected. An approximation for the upper limit on the usable frequency range generated by a given impact is determined by the following formula.

$$\Delta f = \frac{1.25}{t_c}$$

The MSR technique is designed in order to evaluate materials by an indirect testing method. That is, based on the miniature seismic reflection principles the data can be collected successfully from the same surface the signal was generated into the medium. For the evaluation of the elastic properties of concrete and rocks, a direct method can also be used. In the direct method, the impact source 10 and the receiver are on two opposite sides of a sample.

In one preferred embodiment, and depending on the particular given apparatus, for optimum signals, the optical reflectometry laser beam 15 is spaced from the impact device 10 by a distance equal to the thickness being measured, although, in some cases, circumstances may not always permit such optimum positioning.

A setup for optical detection of acoustic/ultrasound waves on concrete based on a TWM demodulator coupled to a very stable laser should be assembled and used. In this setup, the light scattered by the material will be collected and injected into an optical fibre linked to the interferometer. The working distance should be such that the amount of light collected back from the block is high enough to get a signal/noise ratio at least larger than one. Previous tests performed have shown that a working distance of 10 cm gives a reasonable signal to noise ratio. However, if required, collecting mirrors (similar to a satellite dish) can be used to increase the amount of reflected energy that is fed into the interferometer. The photorefractive TWM demodulator is operated by a high voltage source that could be synchronized with the MSR hammer or continuously without the need for a trigger.

For a thickness smaller than 10 cm, one can use hardened steel or ceramic plates of cylindrical or pyramidal shape to increase the frequency bandwidth of the input signal. Thus, controlling, decreasing, the wavelength to less than the thickness of interest. The pyramidal plates can also be called waveguides because one can use them to focus the incident wave onto the target by controlling the angle of the pyramid sides. The use of a plate to create an efficient ground coupling between the source of impact and the material, although known in the industry, has not been used as in the present invention for testing concrete, shotcrete and rocks. Previous tests performed have shown that using this type of plate coupling, a thickness as small as 2 cm can be measured with an accuracy of better than 2 mm.

The signals are processed in the computer 16 in a conventional manner, using conventional programs.

As shown in FIG. 3, when a physical impact source is used, for example in assessing the material of the refractory, the impact body is released to cause an impact on the surface of the refractory. Alternatively, the impact source 10 required by the present invention may be effected by way of an appropriate type of laser beam striking the surface of the material. The impact results in the generation of a stress signal into the medium which transforms into the body waves and surface waves, depending upon the state of the medium. The state of the bonding between the brick, ceramic or composite and the metal or the thickness of the solidified metal in a furnace would direct the wave transformation accordingly. As the body waves travel into the structure detection of a change in the acoustic properties of the medium will result in the acoustic change being reflected towards the direction of the source. Such a change may be representative of an internal crack 40, an originating flaw in the material or that a different material is present. Such determinations assist in the assessment of the integrity of the lining and the state of bonding, in for example, the bonding between the brick, ceramic or composite and the metal in a furnace.

The reflected wavefront is picked up by the optical reflectometry laser which is sensitive both to the vibrations caused by the P-wavefronts at right to the surface and to the vibrations caused by S-wavefronts parallel to the surface. The signals are amplified and transferred to the A/D converter card. The sampling rate and number of data points are determined based on each individual test and with regard to the type of A/D converter card. Measurement of the P- and S-waves are then converted into a frequency domain spectrum. The time domain waveforms T are transferred to a computer to be converted into frequency domain spectra by the FFT program 18. The frequency spectra is generated by signal processing software and displayed by the computer for the required analysis. The frequency associated with the stress wave resonance between the two surfaces (e.g. top surface/flaw or top/bottom surfaces) becomes readily identifiable.

The material thickness T can be evaluated based on P- and/or S-wave velocity (Cp, Cs) and the P- and/or S-wave frequency (f):

$$T = \frac{C_p}{2f}$$

Additional mechanical properties of the material such as elasticity (characterized by the Young modulus E) and compressibility (characterized by the Poisson's ration v) can also be obtained; the shear and bulk moduli can also be obtained:

| Young's Modulus | Shear Modulus | Bulk Modulus | Poisson's Ration |
|---|---|---|---|
| $E = C_p^2 \rho \frac{(1-v)(1-2v)}{(1-v)}$ | $G = \dfrac{K}{\left(\dfrac{C_p^2}{C_s^2 - \dfrac{4}{3}}\right)}$ | $K = \rho\left(C_p^2 - \dfrac{4}{3}C_s^2\right)$ | $v = \dfrac{\left(\dfrac{C_p}{C_s}\right)^2 - 2}{2\left(\dfrac{C_p}{C_s}\right)^2 - 2}$ |

Where:
- ρ is the density of the material in g/cm³;
- v is Poisson's ratio;
- $C_p$ is the P wave velocity; and,
- $C_s$ is the S wave velocity.

As shown in FIG. 3, the optical reflectometry laser 15 is used as a sensor in the system and operates in a frequency range of about 0.1 KHz to about 500 KHz. The advantage of the MSR laser approach resides in the fact that the measurements can be taken at distance allowing a continuous scan to be performed at a fast rate compared to a point-by-point measurement using the ultrasonic or acoustic resonance techniques currently in use. By replacing the mechanical impact device 10 used in MSR by a laser beam 12, one can foresee that such laser based impact source 10 can provide a 100% non-contact equipment for the inspection of a structure material such as a refractory lining.

The advantage of a non-contact approach allows for the more expedient collection of information since it is possible to effect a more "continuous" assessment as the laser beam is moved across the scanned surface and an impacting device hits the surface at a predetermined rate (or frequency).

As set out above, it is shown that the present invention provides for an accurate and more efficient device for assessing material of a structure without requiring contact with the material being assessed.

What is claimed is:

1. A method of unobtrusive evaluation of solid non-flexible structural material integrity without requiring physical contact for referencing integrity values, comprising:
    directing an impact source at said structural material to generate stress waves derived from said structural material;
    obtaining signal information from stress waves emanating from said structural material by optical reflectometry;
    increasing frequency bandwidth of said obtained signal by waveguides; and,
    processing said signal information to determine physical properties of said structural material.

2. The method according to claim 1, wherein said optical reflectometry comprises a laser.

3. The method according to claim 2, wherein said impact source is a mechanical impact source.

4. The method according to claim 3, wherein said signal information includes measuring reflected stress wavefronts.

5. The method according to claim 4, wherein said processing includes processing said stress wavefronts which comprise S- and P-wavefronts.

6. The method according to claim 5, wherein said processing determines physical properties of said structural material which establish integrity characteristics.

7. The method according to claim 6, wherein said integrity characteristics can be stored and viewed on a monitor device.

8. The method according to claim 7, wherein said processing means includes a laser beam.

9. The method according to claim 7, wherein said waveguides comprise plates in a cylindrical or pyramid form.

10. A method of unobtrusive analysis of a refractory component in a kiln or furnace structure without physical contact for referencing integrity values comprising:
    directing an impact source to impact the substrate of a structural material to cause a stress signal in the form of a wavefront;
    transmitting said wavefront to said refractory laser
    detecting an impact signal from said structural material with an optical reflectometry laser; and,
    converting said impact signal to physical property elements of said structural material with programming means.

11. The method of claim 10, wherein said impact source is a laser beam.

12. The method of claim 11, wherein said wavefronts comprise S- and P-wavefronts.

13. The method according to claim 12, wherein said laser directs a signal to said computer program for converting said signal into appropriate forms of said physical properties of said structural material.

14. An apparatus for unobtrusive evaluation of solid non-flexible structural maternal integrity without requiring physical contact for referencing integrity values comprising:
    an impact source;
    an optical reflectometry laser for generating stress signals derived from said structural material and for receiving stress signals from said structural material, said laser generating an output data signal adapted to be received by a computer and
    increasing frequency bandwidth of said stress signals by waveguides; and
    a computer program for determining structural integrity values from stress signals.

15. The apparatus according to claim 14, wherein said optical reflectometry comprises a laser.

16. The apparatus according to claim 15, wherein said impact source is a mechanical impact source.

17. The apparatus according to claim 16, wherein said waveguides comprise plates in a cylindrical or pyramid form.

* * * * *